United States Patent [19]

Ishii

[11] 3,996,045
[45] Dec. 7, 1976

[54] METHOD FOR PRODUCING HIGH-GRADE FERRO-NICKEL DIRECTLY FROM NICKELIFEROUS OXIDE ORES

[75] Inventor: Kotaro Ishii, Shibata, Japan

[73] Assignee: Pacific Metals Co., Ltd., Tokyo, Japan

[22] Filed: Apr. 16, 1975

[21] Appl. No.: 568,583

Related U.S. Application Data

[63] Continuation-in-part of Ser. No. 381,559, July 23, 1973, abandoned.

[30] Foreign Application Priority Data

Sept. 1, 1972  Japan .............................. 47-87175

[52] U.S. Cl. ..................................... 75/11; 75/82; 75/129
[51] Int. Cl.² .......................................... C21C 5/52
[58] Field of Search ........................ 75/82, 129, 11

[56] References Cited

UNITED STATES PATENTS

| | | | |
|---|---|---|---|
| 3,004,846 | 10/1961 | Queneau | 75/82 |
| 3,224,871 | 12/1965 | Collin | 75/11 |

*Primary Examiner*—Peter D. Rosenberg
*Attorney, Agent, or Firm*—Wenderoth, Lind & Ponack

[57] ABSTRACT

A method for producing high-grade ferro-nickel containing 0.4 to 5% of sulfur directly from nickel-containing oxide ores which comprises adding at least one member selected from the group consisting of high-sulfur fuels, elemental sulfur, gypsum, pyrites, nickel sulfide ores, and high-sulfur waste material produced during desulfurization of steels and ferro alloys to the nickel-containing oxide ore to provide a sulfur addition of 0.1 – 3 kilogram per one ton of dry ore, treating the resultant mixture in a pre-reducing furnace or calcining furnace, and smelting the thus treated mixture in an electric furnace.

5 Claims, No Drawings

METHOD FOR PRODUCING HIGH-GRADE FERRO-NICKEL DIRECTLY FROM NICKELIFEROUS OXIDE ORES

This application is a continuation in part of copending application Ser. No. 381,559 filed July 23, 1973 now abandoned.

The present invention relates to a method for producing high-grade ferro-nickel directly from nickeliferous oxide ores, and more particularly relates to a selective reduction and refining of nickel.

When high-grade ferro-nickel is produced by selectively reducing and refining nickel from nickel containing oxide ores and retaining iron in the slag in an electric furnace, it is not satisfactory to merely lower the proportion of reducing agents to the ore to be charged in the furnace, because not only the amount of nickel which goes into the slag increases and the yield of nickel decreases, but also the stability of furnace operation is hard to obtain due to the spouting of molten slag over a non-melted charge layer, caused by non-reduced iron oxides and CO gas. These tendencies are more remarkable in case of ores, such as a laterite ore, which have a high Fe/Ni ratio and show a higher iron content in the slag, and have been attributed to be the reason for prohibition of commercial production of ferro-nickel from laterite ores.

Therefore, the conventional selective reduction and refining methods are limited in their application by the Fe/Ni ratio, the $SiO_2$ content, and the basidity (particularly) $MgO/SiO_2$) of the ores to be used, and it is necessary to employ severe preliminary reduction treatments such as by a strong reduction gas in a rotary kiln and a shaft furnace, or a long roasting time at a constant reduction temperature in order to recover almost all of the nickel content and minimize the reduction of iron for obtaining a high-grade ferro-nickel. In this case, however, it has never been commercially successful to restrict the reduction rate of the iron content below 40 – 50% because it is difficult to obtain stability of the furnace operation as mentioned above. Experimentally, attempts have been made to restrict the iron reduction rate below 40 – 50% by employing special furnace operation technics, such as by using a voltage far much higher than the ordinary voltage in the electric furnace to cover the charge layer with the arc, or by charging the raw materials along the furnace wall so as to provide a molten surface partially around the electrodes.

One of the objects of the present invention is to provide a method for producing a high-grade ferro-nickel by selectively reducing nickel from nickeliferous oxide ores including ores, having a high Fe/Ni ratio, without necessity of special furnace operational technics as required by the conventional arts and without limitation in its application to the types of ores to be treated.

The present inventors have discovered a selective reduction refining method of nickel utilizing unique reactivity which sulfur exhibits in an electric furnace.

Features of the present invention lie in that one or more of various sulfur-containing materials, including high-sulfur fuels such as heavy oil and crude oil, simple sulfur, gypsum, pyrites, nickel sulfide ores, and high-sulfur wastes generated at the time of desulfurization of steels and ferro alloys, is mixed with the materials to be charged in a calcining or preliminary reducing furnace, or is mixed with hot or cold calcined ore taken out from the calcining or preliminary furnace, or is mixed with the material during the treatment in the calcining or preliminary reducing furnace for direct production of high-grade ferro-nickel from nickeliferous ores.

According to the present invention, high-grade ferro-nickel can be produced from low-grade nickel ores having a high Fe/Ni ratio by recovering almost all of the nickel content in the ores. As the sulfur source used in the present invention, not only can gypsum, pyrites, nickel sulfide ores, high-sulfur wastes generated during desulfurization of steels and ferro alloys other than simple sulfur be used, but also high-sulfur fuels such as heavy oil and crude oil and high-sulfur reducing materials such as low-grade coals can be utilized positively. The present invention is distinct and different from the conventional method in which silicate nickel ore is mixed with gypsum or sodium sulfate to convert the nickel content into sulfide and nickel matte is produced therefrom. Thus the present invention produces ferro-nickel by adjusting the addition of the sulfur source, so as to control the sulfur content in ferro-nickel to be produced within an amount of between 5 to 0.4%, preferably 1 to 0.4%.

For example, when the sulfur content in the metal to be produced is 0.8%, about 0.4 kg of simple sulfur is used per one ton of the reduced ore in case when the simple sulfur is mixed with the hot reduced ore, or about 2.0 kg of gypsum (calcium sulfate) is used per one ton of the hot reduced ore, since about 60 to 70% of the sulfur content of the sulfur source added to the reduced ore is retained in the metal. If the sulfur content in the metal is maintained at more than 5%, the procedure becomes similar to the production of the so-called nickel matte and it is necessary to remove the excess sulfur content above 5% in order to produce ferro-nickel from the matte. However, it is difficult and non-economical to remove the excess sulfur by the conventional arts such as by an arc electric furnace, a shaking ladle or by a stirrer. Therefore, it is advantageous to maintain the sulfur content as low as possible from the point of desulfurization, but when the sulfur content in the metal is below 0.4% the desired results of the present invention are not obtained. Therefore, in order to assure maximum effects and yet avoid difficulties in the subsequent desulfurization step and economical problems, the sulfur content in the metal should be 5 to 0.4%, preferably 0.4 to 1.0%.

Regarding the sulfur source to be added, if the sulfur content in the metal produced is to be maintained at 0.8%, about 0.4 kg of elemental sulfur is added, or about 2.0 kg of gypsum (calcium sulfate) is added to the hot reduced ore, because about 60 – 70% of the sulfur in the sulfur source added is retained in the metal. In this case, when the sulfur content in the metal is more than 5%, the process will be similar to that of nickel-matte production, where it is necessary to remove sulfur in excess of 5% for production of ferro-nickel from matte. However, it is very difficult to remove this excess sulfur beyond 5% by the conventional methods, such as, desulfurization in an arc electric furnace, in a shaking ladle or desulfurization by stirring, and the desulfurization by these methods is not economical.

Further, in case of low-grade nickel oxide ores with a high iron content, the iron in the slag is inevitably high according to the present invention, and thus when the sulfur content in the ferro-nickel is higher than a certain value, the difference in gravity between the metal and the slag becomes small, so that the metal particles get into suspension in the slag, thus causing the metal loss. Therefore, it is advantageous in respect of desulfurization to maintain the sulfur content as low as possible, although if the sulfur content in the metal is less than 0.4%, the desired objects of the present invention can not be obtained. Thus, it is preferable to maintain the sulfur content in the metal in the range from 0.4 to 5%, more preferably from 0.4 to 1.0% for obtaining the results of the present invention effectively and performing economical desulfurization.

For carrying out the present invention, the amount of sulfur added to the material ore should be 0.1 to 3 kg per ton of dry ore in order to maintain the sulfur content in the final product in a range from 0.4 to 5% by weight. The nickel content in nickel-containing oxide ores which are commonly used is within a narrow range from 1.5 to 3% so that the amount of sulfur to be added has almost no relation with the nickel content in the ore, but the most desirable range of sulfur to be added is determined based on the amount of ferro-nickel to be produced (generally yield of ferro-nickel is 30 to 70 kg per ton of ore) and the yield of sulfur (generally 40 to 90%) in the processing steps in the calcining furnace, the preliminary reducing furnace and the electric furnace etc. Through various experiments, it had been confirmed that the amount of sulfur to be added should be 0.1 to 3 kg per ton of dry ore.

According to the conventional arts of ferro-nickel production, condensation of sulfur in the metal to be produced has been avoided, but according to the present invention the activities of sulfur are utilized advantageously in the smelting reaction for the ferro-nickel production. Thus, the present inventors have confirmed that the unstableness of the furnace operation due to shortage of reducing agents at the time of selective reduction smelting is completely improved by a small amount of sulfur which contacts the slag interface, that this improved state is not influenced by the slag basidity and the iron content in the slag, and that settlement of fine metal particles floating in the slag is accelerated.

The present invention may be carried out in the following manners.

In case when the preliminary reduction is effected in a rotary kiln, the charge material comprises low-grade coal of high volatile material content and heavy oil mixed with nickeliferous oxide ore, and if further sulfur is needed for the operation of an electric furnace sulfur-containing materials such as gypsum may be added. As stated before, the sulfur-containing materials may be added directly in the rotary kiln charge, or may be added to reduced ore taken out of the rotary kiln, or further may be added to the material in the course of the reduction roasting step. The thus treated material is smelted in the electric furnace to separate crude ferro-nickel and slag. It is not necessary to mix the sulfur-containing materials uniformly with the ore, but it is enough to make these materials reach the slag interface in the electric furnace for obtaining their effects satisfactorily. Therefore, no special device is required for the operation. On the other hand, as the added sulfur source is enveloped by the hot reduced ore in the electric furnace, only very small $SO_2$ gas is produced, and part of $SO_2$ takes part in the reaction of $SO_2 + 2CO \rightarrow S + 2CO_2$ in the reducing atmosphere of the electric furnace to fix the sulfur so that the amount of $SO_2$ gas coming out of the furnace is relatively small and thus only a small size $SO_2$ gas cleaning device is required.

According to the present invention, the operation condition of the electric furnace is stabilized and a sufficiently thick charge layer can be provided so that heat loss is small and heat efficiency is improved, thus remarkably reducing the electric power required by the melting, storing the heat also in the metal layer, and causing any difficulty in the metal flow-out at the time of tapping in spite of the increased melting point of the produced metal due to the decreased carbon and silicon contents.

As mentioned above, the acceleration of settlement of the metal floating in the slag lowers the nickel content in the slag, improves the yield of nickel into the metal bath, and thus 95 to 98% of nickel recovery can be attained in the present invention as compared with 90 to 96% attained by the conventional ferro-nickel smelting arts including known selective reduction smelting arts.

The present invention will be understood more clearly from the following examples, which however are not intended to restrict the present invention.

EXAMPLE 1

This example was conducted using a closed 5,000 kw electric furnace.

The chemical analysis of the nickel oxide ore used is shown in Table 1.

Table 1

| Analysis of Nickel Ore (%) | | | | | | |
|---|---|---|---|---|---|---|
| Ni | T.Fe | Cr | $SiO_2$ | MgO | $Al_2O_3$ | Ig.Loss |
| 2.38 | 20.3 | 1.1 | 36.1 | 15.2 | 3.3 | 9.4 |

T.Fe: Total Fe,
Ig.Loss: Ignition loss

The analysis of the coal used as the reducing agent is shown in Table 2.

Table 2

| Analysis of Coal (%) | | | |
|---|---|---|---|
| F.C | V.M. | Ash | S |
| 46.0 | 43.8 | 10.2 | 0.30 |

F.C: Free carbon,
V.M.: Volatile matter

The nickel ore was crashed into particle size smaller than 10 mm, mixed with about 6% of the coal and about 3% of gypsum, and heated up to 980° C in a counter-flow type rotary kiln of 60 meter length to remove combined water, to reduce parts of the nickel and iron and retain about 0.5% of carbon. The charging rate of the nickel ore into the rotary kiln was 8 tons of dried ore per one hour. Thus obtained hot reduced ore was charged in the 5,000 kw closed electric furnace and smelted. The chemical analysis of the produced metal and slag are shown in Tables 3 and 4 respectively.

Table 3

| Produced Crude Fe-Ni Analysis (%) | | | | | | |
|---|---|---|---|---|---|---|
| Ni | Co | Cr | C | Si | P | S |
| 45.1 | 0.7 | 0.05 | 0.02 | Tr | 0.023 | 0.82 |

Table 4

| | | Produced Slag Analysis (%) | | | |
|---|---|---|---|---|---|
| Ni | T.Fe | SiO$_2$ | MgO | Al$_2$O$_3$ | S |
| 0.08 | 20.3 | 48.0 | 21.0 | 3.9 | 0.03 |

The three-phase, 5,000 kw closed electric furnace was operated at a secondary voltage of 350 v. The furnace operation was very stable and a thick charge layer could be used. The power consumption was 480 KWH per ton of dried ore. The slag temperature at the tapping was 1,580° C, and the metal temperature was 1,510° C. Recovery of Ni, Fe and S into the metal are as shown in Table 5.

Table 5

| Recovery of Ni, Fe and S (%) | | |
|---|---|---|
| Ni | Fe | S |
| 97.7 | 16.1 | 65.2 |

The crude Fe-Ni produced as above was charged in a shaking ladle and calcium carbide was added thereto in a ratio of 40 kg per ton of crude Fe-Ni and desulfurization was conducted by rotating for 10 minutes at 50 r.p.m. to obtain low-carbon ferro-nickel whose chemical analysis is shown in Table 6.

Table 6

| Analysis of Desulfurized Low-Carbon Fe-Ni (%) | | | | | | |
|---|---|---|---|---|---|---|
| Ni | Co | Cr | C | Si | P | S |
| 45.4 | 0.7 | 0.05 | 0.07 | Tr | 0.023 | 0.009 |

EXAMPLE 2

This example was conducted using the same smelting equipment as in Example 1 and simple sulfur as the sulfur source. Chemical analysis of the nickel oxide ore and the coal used in this example are shown in Tables 7 and 8, respectively.

Table 7

| | | Analysis of Nickel Ore (%) | | | | |
|---|---|---|---|---|---|---|
| Ni | T.Fe | Cr | SiO$_2$ | MgO | Al$_2$O$_3$ | Ig-Loss |
| 1.80 | 12.5 | 0.55 | 46.3 | 23.7 | 1.1 | 10.3 |

Table 8

| Analysis of Coal (%) | | | |
|---|---|---|---|
| F.C | V.M. | Ash | S |
| 52 | 41 | 7.3 | 0.4 |

The nickel ore mixed with about 6% of the coal was charged in the rotary kiln at a rate of about 10 tons of dried ore per hour and parts of the nickel and iron contents were reduced, maintaining about 0.5% of the carbon content to remain in the ore taken out of the kiln. Thus obtained reduced ore in red hot state was charged in the 5,000 kw electric furnace together with the addition of simple sulfur at a ratio of about 0.3 kg per ton of the reduced ore. The operation of the electric furnace was smooth and the analysis of obtained metal and slag are shown in Tables 9 and 10, respectively.

Table 9

| | Analysis of Produced Crude Fe-Ni (%) | | | | | |
|---|---|---|---|---|---|---|
| Ni | Co | Cr | C | Si | P | S |
| 47.8 | 0.7 | 0.09 | 0.01 | Tr | 0.019 | 0.97 |

Table 10

| | | Analysis of Produced Slag (%) | | | |
|---|---|---|---|---|---|
| Ni | T.Fe | SiO$_2$ | MgO | Al$_2$O$_3$ | S |
| 0.07 | 12.3 | 53.4 | 27.3 | 1.3 | 0.02 |

The power consumption in this example was 470 KWH per ton of dried ore, the temperatures of the slag and the metal were 1,590° C and 1,510° C respectively. Recoveries of Ni, Fe and S into the metal were as shown in Table 11.

Table 11

| Recoveries of Ni, Fe and S(%) | | |
|---|---|---|
| Ni | Fe | S |
| 97.0 | 14.9 | 68.0 |

The crude Fe-Ni was desulfurized with addition of calcium carbide in a shaking ladle to obtain refined Fe-Ni having the analysis shown in Table 12.

Table 12

| Analysis of Desulfurized Low-Carbon Fe-Ni (%) | | | | | | |
|---|---|---|---|---|---|---|
| Ni | Co | Cr | C | Si | P | S |
| 48.1 | 0.7 | 0.09 | 0.04 | Tr | 0.019 | 0.012 |

The amount of desulfurization by 1 kg of calcium carbide was about 0.27 kg.

EXAMPLE 3

In this example, the same smelting equipment was used as in Example 1, and a part of the coal was substituted by the heavy oil, which was used as fuel, reducing agent, and sulfur source. The analysis of the nickel ore used in this example is shown Table 13.

Table 13

| | | Analysis of Nickel Ore (%) | | | | |
|---|---|---|---|---|---|---|
| Ni | T.Fe | Cr | SiO$_2$ | MgO | Al$_2$O$_3$ | Ig-Loss |
| 2.03 | 14.55 | 0.50 | 45.0 | 25.1 | 1.7 | 13.0 |

The analysis of the coal used as reducing agent and the analysis of the heavy oil used as fuel, reducing agent and sulfur source are shown in Table 14 and Table 15, respectively.

Table 14

| Analysis of Coal (%) | | | |
|---|---|---|---|
| F.C | V.M. | Ash | S |
| 39.5 | 42.1 | 13.7 | 0.6 |

Table 15

| Analysis of Heavy Oil (%) | | | |
|---|---|---|---|
| C | H | O | S |
| 83 | 13 | 1.2 | 2.6 |

The nickel ore mixed with about 30 kg of the coal and about 20 kg of heavy oil was charged in the rotary kiln at a rate of about 12 tons of dried ore per hour and parts of the nickel and iron contents were reduced by maintaining the furnace temperature up to 1,000° C. The analysis of thus obtained reduced ore is shown in Table 16 in comparison with that obtained by using the coal alone without using the heavy oil.

Table 16

| Treating Conditions and Analysis of Reduced Ores | | |
|---|---|---|
| | Coal Addition kg/t of dried ore | Heavy Oil Addition kg/t of dried ore |
| Heavy Oil + Coal | 30 | 20 |
| Coal | 60 | 0 |

Analysis of Reduced Ores

| T.Ni | M.Ni | T.Fe. | M.Fe | Fe²⁺ | Fe³⁺ | S | C | Reduction rate of Ni | Reduction rate of Fe |
|---|---|---|---|---|---|---|---|---|---|
| 2.43 | 1.58 | 17.38 | 1.86 | 15.32 | 0.20 | 0.06 | 0.4 | 65.3 | 10.7 |
| 2.32 | 0.81 | 16.50 | 1.47 | 14.01 | 1.02 | 0.02 | 0.5 | 35.0 | 8.9 |

T.Ni:Total Ni,
M.Ni:Metallic Ni,
T.Fe:Total Fe,
M.Fe:Metallic Fe

From the above, it is understood that when a part of the coal is substituted by heavy oil, the nickel reduction rate is remarkably increased while the reduction of iron is restricted and thus nickel can be selectively reduced, and it is also seen that the heavy oil acts as sulfur addition agent.

The above obtained reduced ore was charged in the electric furnace and crude Fe-Ni having an analysis shown in Table 17 was obtained. Recoveries of Ni, Fe and S are shown in Table 18.

Table 18

| Recoveries of Ni, Fe and S (%) | | |
|---|---|---|
| Ni | Fe | S |
| 96.8 | 13.4 | 65.9 |

The above crude Fe-Ni was desulfurized and refined ferro-nickel as shown in Table 19 was obtained.

Table 19

| Analysis of Desulfurized Low-Carbon Fe-Ni (%) | | | | | | |
|---|---|---|---|---|---|---|
| Ni | Co | Cr | C | Si | P | S |
| 50.5 | 0.8 | 0.07 | 0.02 | Tr | 0.019 | 0.008 |

EXAMPLE 4

The same ore, coal and smelting apparatus as used in Example 1 were used, and various amounts of gypsum as sulfur source were added to determine the effects of the amounts of gypsum on the nickel yield in ferro-nickel, electric power consumption, the electric furnace operation condition, the sulfur content in ferro-nickel and the amount of calcium carbide necessary for refining the metal to lower the sulfur content to 0.02% or lower. The results are shown in Table 20.

Table 20

| Effects of Gypsum Addition | | | | | |
|---|---|---|---|---|---|
| Gypsum Addition kg/t of dry ore | Ni Yield (%) | Power Consumption KWH/t of dry ore | Furnace Condition | S Content in Ferro-Nickel (%) | Calcium Carbide kg/t of Ferro-Nickel |
| 25 | 94.7 | 510 | good | 7.0 | 242 |
| 15 | 96.4 | 500 | ″ | 5.0 | 150 |
| 10 | 97.5 | 480 | ″ | 5.0 | 98 |
| 7 | 97.8 | 470 | ″ | 1.9 | 73 |
| 3 | 97.9 | 470 | ″ | 1.0 | 35 |
| 2 | 98.0 | 480 | ″ | 0.7 | 26 |
| 1 | 96.0 | 480 | ″ | 0.4 | 15 |
| 0.5 | 93.8 | 500 | slightly good | 0.3 | 13 |
| 0 | 89.9 | 560 | bad | 0.2 | 10 |

As shown in Table 20, when gypsum is added in an amount ranging from 0 to 25 kg per ton of dry ore (0 to 5 kg sulfur per ton of dry ore) to vary the sulfur content in the high-quality ferro-nickel product between 0.2 to 7%, it is understood that good operation results can be obtained from the aspects of the nickel yield, power consumption and furnace conditions, etc. Thus with the sulfur content between 0.4 and 5%, the nickel yield is 96% or more and the power source is not more than 500 KWH/t, and the furnace condition is good when not less than 0.4% of sulfur is contained in the ferro-nickel. However, as the sulfur content in the ferro-nickel increases, the amount of calcium carbide re- Table 17

| Analysis of Crude Fe-Ni (%) | | | | | | |
|---|---|---|---|---|---|---|
| Ni | Co | Cr | C | Si | P | S |
| 50.2 | 0.8 | 0.07 | 0.01 | Tr | 0.019 | 0.90 | quired for refining remarkably increases, and power consumption necessary for decomposition of gypsum and the amount of slag produced increases. Therefore, excessive sulfur addition is not desirable from an economical aspect.

Therefore, in the present invention, which aims at direct production of high-quality ferro-nickel from nickel-containing oxide ores, the sulfur content in the ferro-nickel should be determined from the two main factors, the nickel yield and the power consumption, and should be maintained between 0.4 and 5%, preferably, 0.4 and 1%.

EXAMPLE 5

Low-grade nickel oxide ore having a high iron content was smelted, using the same coal and the same smelting apparatus as in Example 1.

The chemical composition of the ore used is shown in Table 21.

Table 21

| | Chemical Composition of Low Grade Nickel Ore (%) | | | | | |
|---|---|---|---|---|---|---|
| Ni | T.Fe | Cr | $SiO_2$ | MgO | $Al_2O_3$ | Ig-Loss |
| 1.58 | 19.26 | 1.7 | 27.4 | 23.5 | 4.7 | 13.0 |

The addition of iron sulfide (50% Fe, 35% S) was varied to determine the nickel yield in the final ferro-nickel, power consumption, electric furnace conditions, sulfur content in the ferro-nickel, and amount of calcium carbide required for refining. The results are shown in Table 22.

Table 22

Effects of Addition of Iron Sulfide Ore

| Addition of Iron Sulfide Ore kg/t of Dry Ore | Nickel Yield (%) | Power Consumption kg/t of Dry Ore | Condition of Electric Furnace | S Content in Ferro-Nickel (%) | Amount of Calcium Carbide kg/t of Ferro-Nickel |
|---|---|---|---|---|---|
| 12.1 | 87.4 | 500 | good | 7.1 | 280 |
| 6.2 | 90.3 | 490 | " | 4.9 | 144 |
| 5.7 | 92.8 | 470 | " | 4.0 | 124 |
| 4.7 | 95.0 | 460 | " | 3.5 | 110 |
| 3.9 | 95.8 | 460 | " | 2.3 | 85 |
| 1.1 | 93.3 | 470 | " | 1.1 | 38 |
| 0.8 | 92.7 | 490 | " | 0.6 | 24 |
| 0.4 | 90.0 | 520 | slightly good | 0.4 | 16 |
| 0 | 83.7 | 560 | bad | 0.3 | 14 |

As seen from Table 22, when the addition ratio of the iron sulfide ore to the ore to be treated was changed ranging from 0 to 12.1 kg per ton of dry ore (0.4 to 4.2 kg sulfur per ton of dry ore), the sulfur content in the ferro-nickel produced varied within a range from 0.3 to 7.1%. As the result, the nickel yield was 90% or more with a sulfur content in the ferro-nickel between 0.4 and 4.9% and the power consumption was not more than 490 KWH/per ton of dry ore with the sulfur content between 0.6 and 4.9%.

Thus, in case of a high-iron ore, about 0.4% of sulfur in the ferro-nickel is not enough, and 0.6% or more of sulfur is required from the aspect of the furnace operation. However, if the sulfur content is increased excessively the difference in gravity between the high-iron slag and the sulfur-containing ferro-nickel becomes small so that ferro-nickel metal particles are suspended in the slag, thus causing metal loss, and also the amount of calcium carbide required for refining increases. Therefore the upper limit of the sulfur content is about 5%.

What is claimed is:

1. A method for producing high-grade ferro-nickel containing 0.4 to 5% of sulfur directly from nickel-containing oxide ores which comprises adding at least one member selected from the group consisting of high-sulfur fuels, elemental sulfur, gypsum, pyrites, nickel sulfide ores, low grade coals and high-sulfur waste material produced during desulfurization of steels and ferro alloys to the nickel-containing oxide ore in an amount sufficient to provide a sulfur addition of 0.1 – 3 kilograms per ton of dry ore, treating the resultant mixture in a pre-reducing furnace or calcining furnace, and smelting the thus treated mixture in an electric furnace to obtain ferro-nickel containing 0.4 to 5% of sulfur.

2. The method according to claim 1, wherein the high-sulfur fuel is a heavy oil or a crude oil.

3. A method for producing high-grade ferro-nickel containing 0.4 to 5% of sulfur directly from nickel-containing oxide ores which comprises treating the nickel-containing oxide ore in a pre-reducing furnace or calcining furnace, adding at least one member selected from the group consisting of high-sulfur fuels, elemental sulfur, gypsum, pyrites, nickel sulfide ores, low grade coals and high-sulfur waste material produced during desulfurization of steels and ferro alloys to the calcined ore in an amount sufficient to provide a sulfur addition of 0.1 – 3 kilograms per ton of dry ore to be smelted, and smelting the resultant mixture in an electric furnace to obtain ferro-nickel containing 0.4 to 5% of sulfur.

4. The method according to claim 1, wherein the ferro-nickel contains 0.4 to 1% of sulfur.

5. The method according to claim 3, wherein the ferro-nickel contains 0.4 to 1% of sulfur.

* * * * *